United States Patent
Beardsley et al.

[11] Patent Number: 6,035,347
[45] Date of Patent: Mar. 7, 2000

[54] SECURE STORE IMPLEMENTATION ON COMMON PLATFORM STORAGE SUBSYSTEM (CPSS) BY STORING WRITE DATA IN NON-VOLATILE BUFFER

[75] Inventors: Brent Cameron Beardsley; Michael Thomas Benhase; Forrest Lee Wade, all of Tucson, Ariz.

[73] Assignee: International Business Machines Corporation, Armonk, N.Y.

[21] Appl. No.: 08/994,312

[22] Filed: Dec. 19, 1997

[51] Int. Cl.[7] .................................................. C06F 11/10
[52] U.S. Cl. ............................... 710/52; 714/6; 714/22; 710/57; 710/17
[58] Field of Search ............................. 714/6, 5, 13, 22; 371/51.1; 710/52, 57, 17, 33

[56] References Cited

U.S. PATENT DOCUMENTS

| | | | |
|---|---|---|---|
| 5,265,098 | 11/1993 | Mattson et al. | 714/710 |
| 5,274,799 | 12/1993 | Brant et al. | 395/575 |
| 5,375,227 | 12/1994 | Akatsu et al. | 711/113 |
| 5,379,417 | 1/1995 | Lui et al. | 706/916 |
| 5,388,108 | 2/1995 | Demoss et al. | 714/710 |
| 5,440,727 | 8/1995 | Bhide et al. | 711/117 |
| 5,463,765 | 10/1995 | Kakuta et al. | 711/114 |
| 5,504,857 | 4/1996 | Baird et al. | 714/6 |
| 5,504,858 | 4/1996 | Ellis et al. | 714/52 |
| 5,504,861 | 4/1996 | Crockett et al. | 364/DIG. 1 |
| 5,515,333 | 5/1996 | Fujita et al. | 365/229 |
| 5,522,032 | 5/1996 | Franaszek et al. | 714/805 |
| 5,524,204 | 6/1996 | Verdoorn, Jr. | 714/114 |
| 5,526,482 | 6/1996 | Stallmo et al. | 714/805 |
| 5,548,711 | 8/1996 | Brant et al. | 711/114 |
| 5,579,475 | 11/1996 | Blaum et al. | 714/767 |
| 5,596,708 | 1/1997 | Weber | 714/42 |
| 5,615,329 | 3/1997 | Kern et al. | 714/6 |
| 5,633,999 | 5/1997 | Clowes et al. | 714/40 |
| 5,774,643 | 6/1998 | Lubbers et al. | 711/114 |
| 5,893,140 | 4/1999 | Vahalia et al. | 711/118 |

FOREIGN PATENT DOCUMENTS

| | | |
|---|---|---|
| 6-266510 | 12/1994 | Japan . |
| 8-272666 | 10/1996 | Japan . |

OTHER PUBLICATIONS

IBM® Technical Disclosure Bulletin, vol. 36, No. 10 (Oct. 1993), "Scheme for Controlling Concurrent Algorithms that Update Linked Data Structures", © IBM Corp.

Mishra, S. K., et al., "Performance study of RAID–5 disk arrays with data and parity cache", vol. 1 Architecture, Proceedings of 25th International Conference on Parallel Processing, IEEE Comput. Soc. Press, vol. 1, pp. 222–229 (1996), ISBN 081867623X (Abstract only).

Yu, P. S., et al., "Dynamic parity grouping for improving write performance of RAID–5 disk arrays", Proceedings of the 1994 Annual International Conference on Parallel Processing, CRC Press, vol. 2, pp. 193–196 (1994), ISBN 0849324963 (Abstract only).

(List continued on next page.)

Primary Examiner—Thomas C. Lee
Assistant Examiner—Harold J. Kim
Attorney, Agent, or Firm—Altera Law Group, LLC

[57] ABSTRACT

A data storage system and method for securely storing data includes (a) a host CPU; (b) a non-volatile storage (NVS) memory for storing data; (c) a processor, the processor being coupled to the host CPU and the NVS memory and monitoring availability of space in the NVS memory and in a non-volatile buffer (NV-Buffer); and (d) the NV-Buffer, the NV-Buffer being coupled to the host CPU, the NVS memory, and the processor, upon receiving a request to write data into the NVS memory, the host CPU storing data to be transferred to the NVS memory into the NV-Buffer, and upon receiving a confirmation message that data of a write operation to the NV-Buffer is committed, the NV-Buffer transferring the data to the NVS memory. The NVS memory includes a fast dump space for storing data transferred from the NV-Buffer when a main power is down and for restoring back data from the NVS memory to the NV-Buffer when the power is up. The NV-Buffer is a fast drain buffer and is equipped with a backup power source sufficient to hold up a power needed to transfer the data when the power is down.

21 Claims, 6 Drawing Sheets

OTHER PUBLICATIONS

Franaszek, P.A., et al., "On variable scope of parity protection in disk arrays", IEEE Trans. Comput., vol. 46, No. 2, pp. 234–240 (Feb. 1997) (Abstract only).

Lee, Min–Young, et al., "Performance and reliability evaluation of sparing schemes under reconstruction", J. Kiss, *Comput. Syst. Theory* (South Korea), vol. 23, No. 8, Korea Inf. Sci. Soc., pp. 858–868 (Aug. 1996), ISSN 02589125) (Abstract only).

Travis, B., "SCSI–based RAID systems provide storage redundancy, enhance data–transfer rate", *EDN* (European edition), vol. 39, No. 24, pp–81–82 and 88 (Nov. 1994), ISSN 00127515 (Abstract only).

Wu, M., et al., "eNYy: a nonvolatile main memory storage system", Proceedings, Fourth Workshop on Workstation Operating Systems, Cat. No. 93TH0553–8 (WWOS–III, Napa, California, Oct. 14–15, 1993), ISBN 0818640006 (Abstract only).

SECURE STORE IMPLEMENTATION ON COMMON PLATFORM STORAGE SUBSYSTEM (CPSS) BY STORING WRITE DATA IN NON-VOLATILE BUFFER

BACKGROUND OF THE INVENTION

1. Field of the Invention

The present invention relates in general to a computer storage system and method. In particular, the invention relates to a technique for secure storage within a data storage system or subsystem including a host CPU and a non-volatile storage (NVS) memory and also to a method of securely storing data in the system.

2. Background of the Invention

The fundamental structure of a modern computer includes a data storage system or subsystem including a host central processing unit (CPU) and a secondary storage device, such as a non-volatile storage (NVS) memory. Methods and systems for storing and managing data between the host CPU and the NVS memory have been proposed.

In the conventional systems or subsystems, a failure due to data corruption resulting from an error in a write operation can cause the write operation to be nullified. In addition, in the conventional systems or subsystems, the loss of power during a write operation can cause the data in the non-volatile storage memory to be overwritten or destroyed.

The above problems can be demonstrated in a conventional computer storage system shown in FIG. 1. FIG. 2 is a flowchart of the process of writing data to a non-volatile storage (NVS) memory. The system has a host central processing unit (CPU), a host adapter (HA), a NVS Space Manager (NSM), and the NVS memory. The NVS memory has a control block space to receive the characteristics of the data, such as its address, length, sequence, etc. The NVS memory also has a write data space to receive the data. The process of writing data is as follows:

1) HA sends a Write request to NSM.
2) NSM allocates the control block space and write data space of the NVS memory.
3) NSM updates a control block in a track slot of the control block space of the NVS memory.
4) NSM informs HA to use the track slot in the control block space of the NVS memory.
5) HA transfers data to the write data space of the NVS memory.
6) HA signals Write-operation complete to Host CPU.
7) Host CPU acknowledges receipt of the Write-Operation complete.
8) HA updates the control block space of the NVS memory.

It is apparent that data in the NVS memory can be overwritten or destroyed in case of write aborts due to the power loss or errors during or after step 5). The crossed-out portions of the storing slots in the write data space of the NVS memory illustrate the overwritten or destroyed data. Thus, it is apparent that a need exists for an improved computer storage system which can securely store data and prevent the data from being overwritten or destroyed due to the loss of power, or errors occurred during the storing process.

One solution to the problem is to disallow NVS updates until the current data in the NVS memory is destaged to disk or other storage devices. This solution significantly degrades the performance of the system. A second solution to the problem is to allocate additional write data space and control block space in the NVS memory, for example, holding both copy n and copy n−1 of the write data. The second solution would increase the NVS memory overhead, both size and cost. Further, the second solution would increase complexity to the process during the power loss as synchronizing step 8) is complicated.

Another problem of the conventional computer storage system is that a battery is implemented to support the system when the power is down. The longer the power is down, the higher the capacity of the battery is required. It is very expensive to have a high capacitated battery. Furthermore, no matter how high the capacity is, there is a limit of the power down time.

Therefore, there is a need for an improved computer storage system which can securely store data and prevent the data from being overwritten or destroyed due to the loss of power, or errors occurred during the storing process without being significantly penalized in other ways. Further, there is a need for an improved computer storage system which is arranged and configured to reduce the cost of backup power source when the power is down without losing any data.

SUMMARY OF THE INVENTION

The present invention relates in general to a computer storage system. In particular, the invention relates to a secured data storage system between a host CPU and a non-volatile storage (NVS) memory and also to a method of securely storing data in the system.

In accordance with the principles of the present invention, a non-volatile buffer (NV-Buffer) is introduced in the system to temporarily store write data therein and to transfer the data to the NVS memory upon a confirmation message that a data of a write operation is committed is received.

Further in accordance with the principles of the present invention, the NVS memory includes a fast dump space to store data transferred from the NV-Buffer when power is down, and to restore the data to the NV-Buffer when the NVS initializes whereby the data which has been previously committed to have been completely written in the NV-Buffer will continue to be transferred to a write data space and a control block space of the NVS memory.

Another aspect of the present invention is that a fast drain NV-Buffer and a NVS processor having an inexpensive backup power source, such as a capacitor or capacitor bank, are used to replace a standard battery.

Yet another aspect of the present invention is that a NVS processor having an inexpensive backup power source, such as a capacitor or capacitor bank, is used to replace a standard battery.

Therefore, according to one aspect of the invention, there is provided a data storage system for securely storing data. The system includes a host CPU, a non-volatile storage (NVS) memory for storing data, a processor being coupled to the host CPU and the NVS memory and monitoring availability of space in the NVS memory and in a non-volatile buffer (NV-Buffer), and wherein upon receiving a request to write data into the NVS memory, the host CPU stores the data to be transferred to the NVS memory into the NV-Buffer, and upon receiving a confirmation message that data of a write operation to the NV-Buffer is committed, the NV-Buffer transfers the data to the NVS memory.

According to another aspect of the invention, there is provided the system as recited above wherein the NV-Buffer includes at least one track slot, the track slot including a mailbox unit which receives the confirmation message that data of a write operation is committed, a control block unit which stores characteristics of the data requested to be stored, a write data unit which stores the contents of the data.

According to still another aspect of the invention, there is provided the system as recited above wherein the NVS memory includes a control block space for receiving contents from the control block unit of the NV-Buffer and a write data space for storing contents of the write data unit of the NV-Buffer, such that upon receiving the confirmation message that data of a write operation from the host CPU to the NV-Buffer is committed, the NV-Buffer transferring the data to the NVS memory.

According to a further aspect of the invention, there is provided the system as recited above wherein the NVS memory further includes a fast dump space for storing the track slot of the NV-Buffer transferred when power is down and for restoring back the track slot to the NV-Buffer when the NVS memory initializes, i.e., when the power is up.

The present invention is also a method for securely storing data in a data storage system. The method includes the steps of receiving by a host CPU a request to write data into a non-volatile storage (NVS) memory of the data storage system, monitoring by a processor availability of space in the NVS memory and in a non-volatile buffer (NV-Buffer), transferring the data to the NV-Buffer if space is allocated, transferring the data from the NV-Buffer to the NVS memory upon receiving a confirmation message that data of a write operation to the NV-Buffer is committed.

According to a further aspect of the invention, there is provided the method as recited above further including the step of acknowledging to the processor that at least one track slot of the NV-Buffer is available for reuse after completing transferring the data from the NV-Buffer to the NVS memory.

According to another aspect of the invention, there is provided the method as recited above further including the step of transferring the data stored in the NV-Buffer to a fast dump space of the NVS memory.

According to still another aspect of the invention, there is provided the method as recited above further including the step of restoring the transferred data back to the NV-Buffer from the fast dump space of the NVS memory.

According to yet another aspect of the invention, there is provided the method as recited above, wherein the step of transferring the data from the NV-Buffer to the NVS memory includes transferring data from a write data unit of the NV-Buffer to a write data space of the NVS memory and characteristics of the data from a control block unit of the NV-Buffer to a control block space of the NVS memory.

The invention is also a computer storage system, which includes a host central processing unit (Host CPU), a host adapter (HA), a non-volatile storage space manager (NSM), a non-volatile buffer (NV-Buffer) having a plurality of track slots, each track slot having a mailbox unit which receives a confirmation message that data of a write operation is committed, a control block unit which stores characteristics of data requested to be stored, a write data unit which stores the contents of the data requested to be stored, a non-volatile storage processor (NVS Processor), the storage processor being coupled to the NV-Buffer and to the non-volatile space manager to indicate that one of the track slots is available to be reused, and a non-volatile storage memory (NVS memory) including a control block space for receiving contents from the control block unit of the NV-Buffer and a write data space for storing contents of the write data unit of the NV-Buffer.

Further in a further aspect of the above recited the computer storage system, the NVS memory further includes a fast dump space for storing the track slots of the buffer when power is down and for restoring back the track slots to the non-volatile buffer when the NVS memory initializes.

The present invention is further a method of storing data in a computer storage system. The method includes the steps of sending a write data signal by a host adapter (HA) to a non-volatile space manager (NSM), allocating by the non-volatile space manager a plurality of track slots in a non-volatile buffer (NV-Buffer), allocating by the non-volatile space manager track slots of a write data space in a non-volatile storage (NVS) memory, updating by the non-volatile space manager a control block unit of one of the track slots in the NV-Buffer, sending by the non-volatile space manager a signal to the host adapter to use the track slot in the NV-Buffer, transferring data to a write data unit of the one of the track slot in the NV-Buffer, transferring a confirmation message that data of a write operation is committed to a mailbox unit of the NV-Buffer, transferring the data from the write data unit of the NV-Buffer to the write data space of the NVS memory, transferring contents from the control block unit of the NV-Buffer to a control block space of the NVS memory, and sending a signal by a non-volatile storage processor (NVS Processor) to the non-volatile space manager to indicate the track slot of the buffer is available for reuse, signaling by the host adapter to a host central processing unit (Host CPU) that the write operation is complete, acknowledging by the host central processing unit to the host adapter receipt of the write operation complete signal sent by the host adapter.

In a further aspect of the above recited method of storing data in the computer storage system, the method includes the steps of transferring entire track slots of the NV-Buffer to a non-volatile storage fast dump space of the NVS memory.

Yet in another aspect of the above recited method of storing data in the computer system, the method further includes the steps of restoring at least a portion of the transferred track slots of the NV-Buffer from the fast dump space of the NVS memory to the track slots of the NV-Buffer.

The present invention is also a data storage system for securely storing data. The data storage system being supported by a main power source includes a host CPU, a non-volatile storage (NVS) memory for storing data including a fast dump space, a processor, the processor being coupled to the host CPU and the NVS memory and monitoring availability of space in the NVS memory and in a NV-Buffer, the NV-Buffer being coupled to the host CPU, the NVS memory, and the processor. The NV-Buffer includes a backup power source, wherein when the main power source is down, the backup power source having a sufficient power support for the data stored in the NV-Buffer to be transferred and stored in the fast dump space of the NVS memory.

Another aspect of the above recited data storage system, when the main power source is up, the data stored in the fast dump space of the NVS memory is transferred and restored back to the NV-Buffer, and when the main power source is up, the backup power source is recharged. In one embodiment, the backup power source is a capacitor or a capacitor bank or pool.

The present invention securely stores data to a non-volatile storage memory which prevents the data to be overwritten or destroyed or incompletely transferred during power loss. Further, the invention reduces the size of the non-volatile storage memory. The size of the NV-Buffer is significantly small in comparison to the traditionally required additional space in the NVS memory. The cost of capacitor(s) to hold up for the transfer and storage of data and instructions during main power down is inexpensive compared to the cost of a battery specially to support the NVS processor. Thus, the cost of the present data storage system is dramatically reduced.

The present invention also utilizes a flexible and relative inexpensive processor and its memory operatively in connection with the NVS buffer.

Other advantages, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE ILLUSTRATED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment and Implementation

Figure 1:
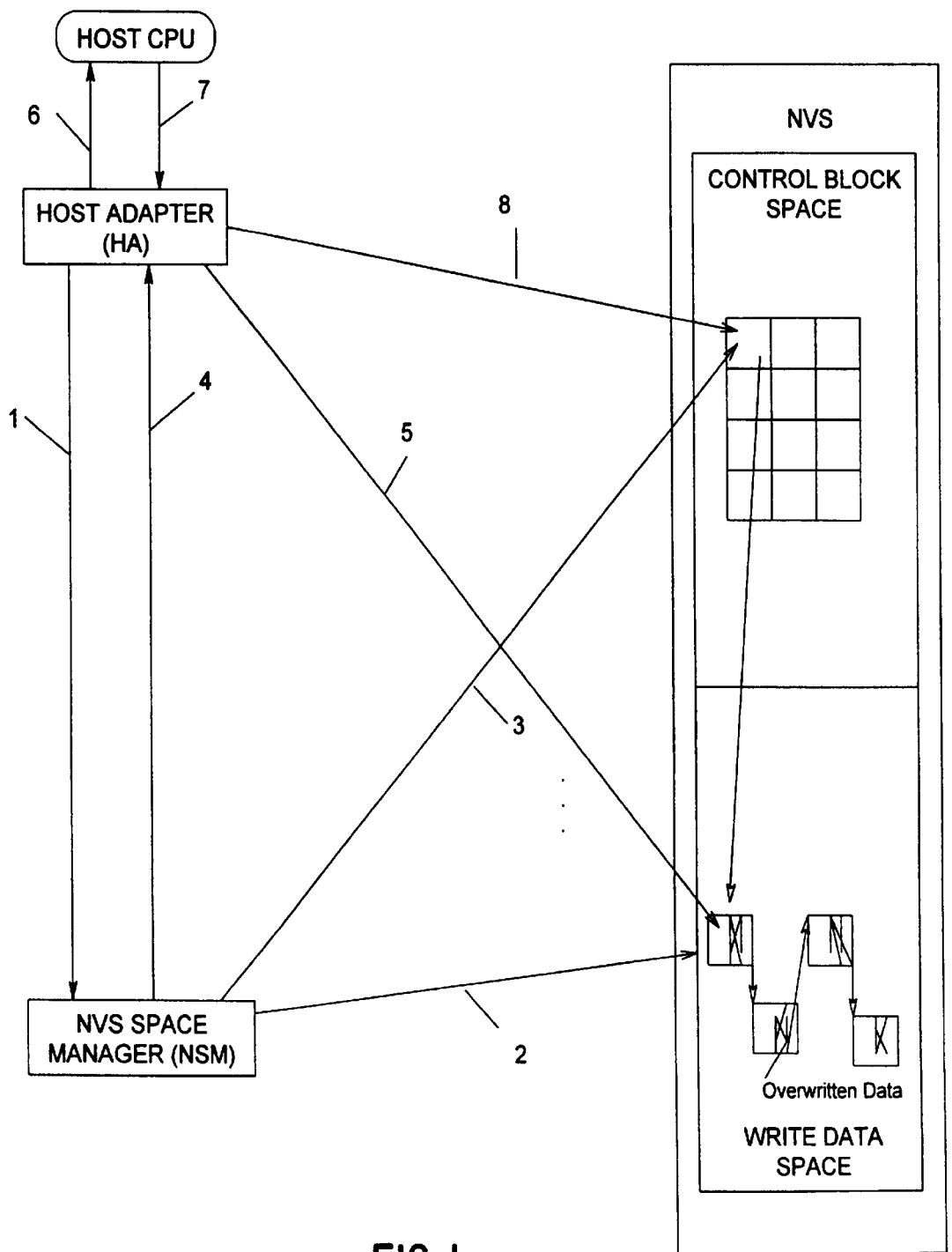
FIG. 1 is a block diagram of a conventional computer storage system.
Figure 2:
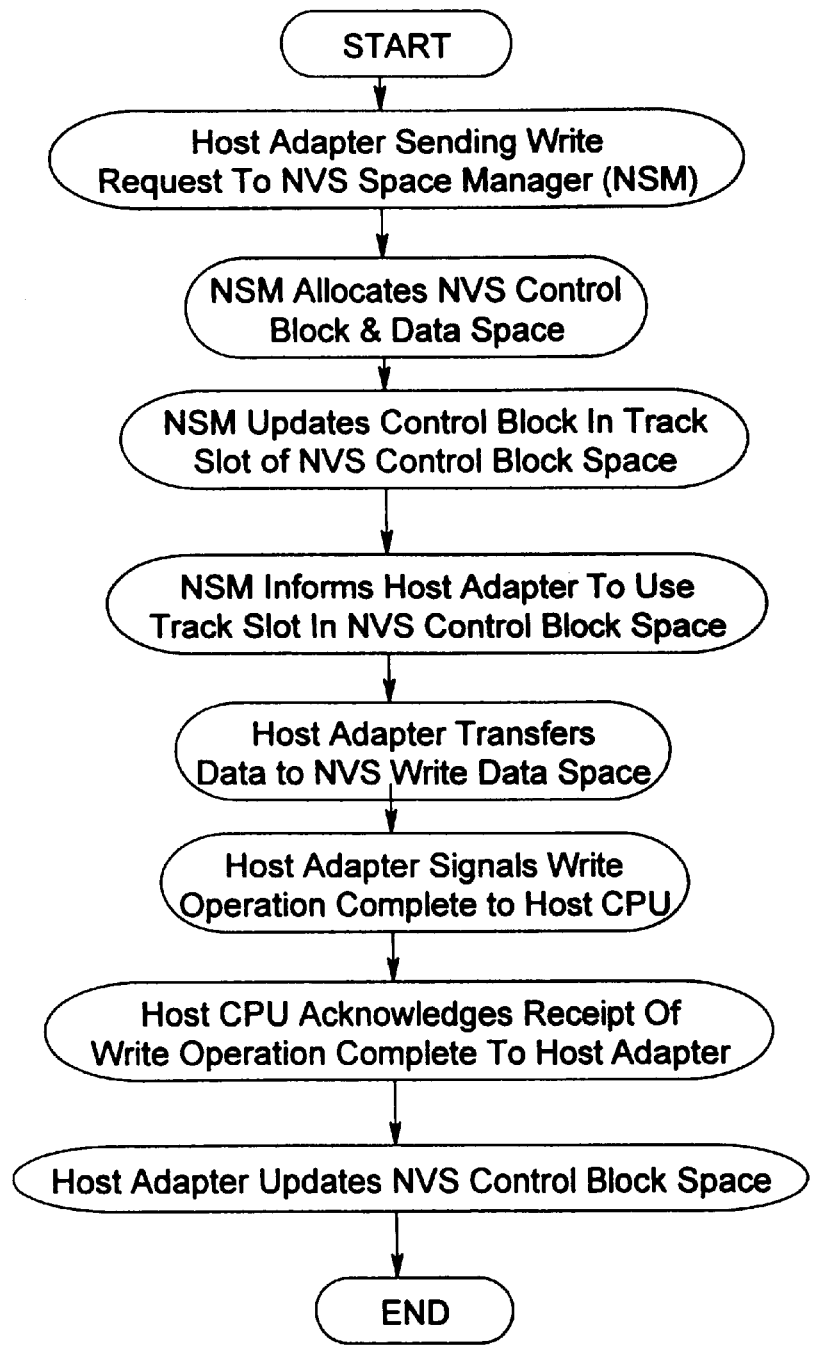
FIG. 2 is a flowchart of writing data in the conventional computer storage system.
Figure 3:
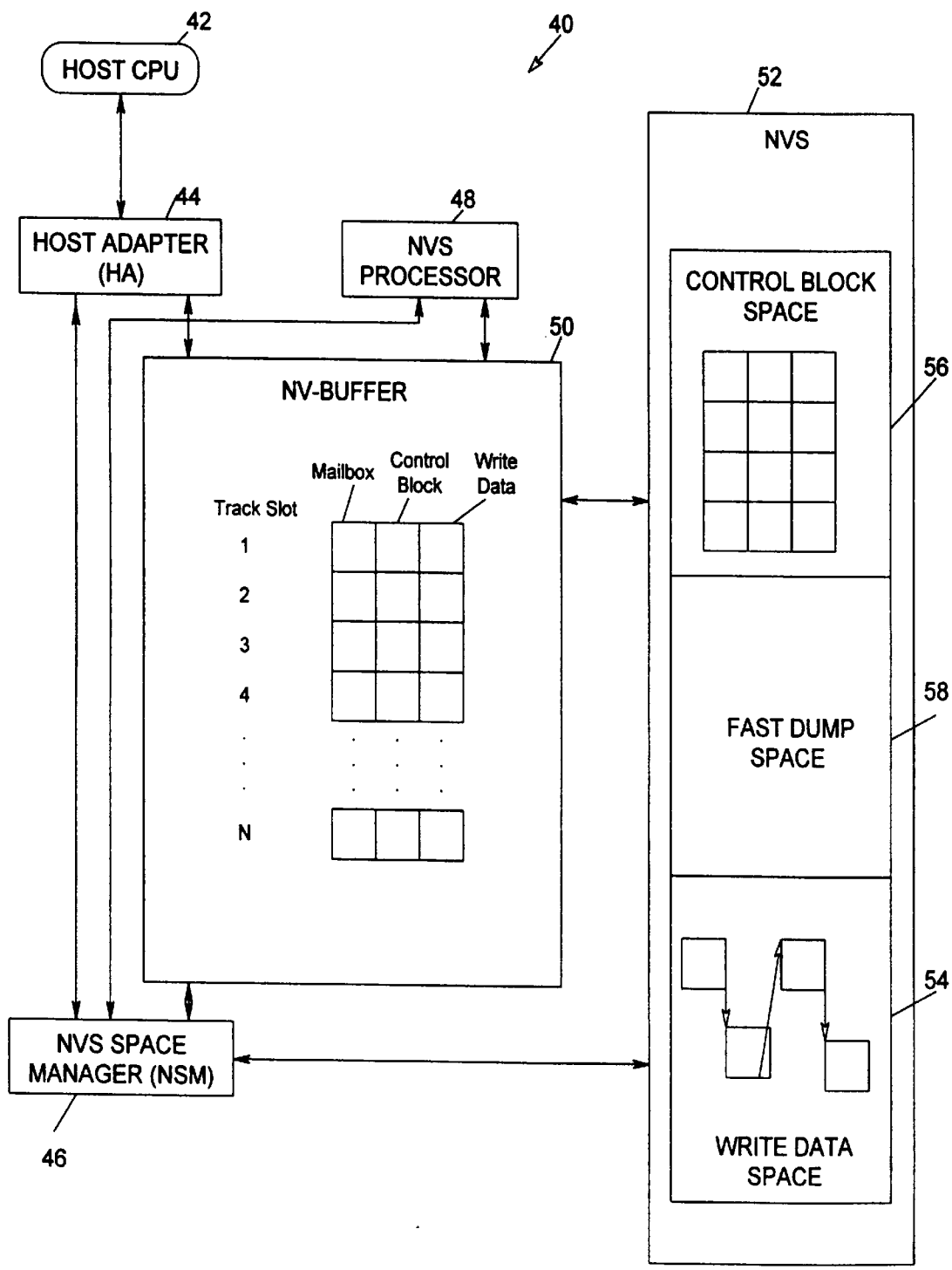
FIG. 3 is a block diagram of a computer storage system consistent with the present invention.

FIG. 3 is an exemplary hardware environment used to implement the preferred embodiment of the invention. In FIG. 3, there is depicted a block diagram of a computer data storage system 40 which may be utilized to implement the method and system of the present invention. The primary hardware components and interconnections of a computer data storage system 40 arranged and configured for utilizing the present invention are shown in FIG. 3. A host central processing unit (CPU) 42 is coupled with a host adapter (HA) 44, the acronym of which is a system adapter (SA). The host adapter 44 sends a Write request to a non-volatile storage (NVS) Space Manager (NSM) 46. The NSM 46 is coupled to the host adapter 44. The NSM 46 is also coupled to a non-volatile storage (NVS) processor 48. It will be appreciated by a person skilled in the art that the NSM 46 and the NVS processor 48 can be arranged and configured into one unit. The NVS processor 48 signals the NSM 46 that a track slot in a non-volatile buffer (NV-Buffer) 50 is available for reuse. The NVS processor 48 can be implemented by using IBM PPC-403 processor with a IBM VOYAGER memory controller (see below implementation). It will be appreciated that other types of processors can be used without departing from the scope or spirit of the principles of the present invention.

Further in FIG. 3, the system 40 includes a non-volatile storage (NVS) memory 52. The NVS memory 52 is coupled to the NSM 46 whereby the NSM allocates track slots in a write data space 54 of the NVS memory 52. The NVS memory 52 also has a control block space 56. The control block space 56 may include a plurality of track slots to store control blocks of the write data. The write data space 54 may also include a string or stack of track slots to store the write data. In addition, the NVS memory 54 includes a fast dump space 58. The fast dump space 58 may store a copy of the entire NV-Buffer 50. When power is down, the entire contents of the NV-Buffer 50 are transferred to the fast dump space 58 so as to preserve the data committed to the NV-Buffer 50. When power is back, the contents of the fast dump space 58 are restored back to the NV-Buffer 50 so that the committed Write operation previously stored in the NV-Buffer 50 continues. The details of this process are discussed later. It will be appreciated that a desired portion of the contents of the NV-Buffer 50 may be transferred to the fast dump space 58 of the NVS memory 52, generally in accordance with the principles of the present invention. It will also be appreciated that a desired portion of the contents of the fast dump space 58 of the NVS memory 52 may be transferred back to the NV-Buffer 50, generally in accordance with the principles of the present invention. In one embodiment, the NVS memory 52 is supported by a battery assembly or pool when the main power is down.

In implementation of the above preferred embodiment, the NVS processor 48 can be a IBM PPC-403 processor and IBM VOYAGER memory controller which are supported on a Common Platform Storage Subsystem (CPSS), a subsystem used in IBM PowerPC™. It will be appreciated that a single chip processor, such as Intel I960RP, Intel I960RD, etc., may be used without departure from the principles of the present invention. In a preferred embodiment, minimal additional hardware design is required, and further, an early power down warning hardware may be used to signal the processor that the power will be down so that an interrupt to the NVS processor is processed. The NVS processor 48 is supported by a backup power source, such as a capacitor or a capacitor bank (pool), when the power is down. Using a capacitor or capacitors in the capacitor pool instead of using a battery to support the processor, the cost is significantly reduced. The capacitor(s) are arranged to have sufficient power to allow the data stored in the NV-Buffer 50 to be placed in a secured space and the data or instructions stored in the cache memories to be placed in the secured space. In a preferred embodiment, the NV-Buffer is supported by a capacitor or a capacitor bank when the main power is down. The processor 48 then transfers data and instructions in its cache memories and data in the NV-Buffer 50 to the NVS memory 52 via a fast dump operation. The details regarding the fast dump operation when the main power is down are described later. In an alternative embodiment, the NV-Buffer is supported by a battery assembly or pool when the main power is down. The processor 48 then may transfer data and instructions in its cache memories to the NV-Buffer 50 whereby a fast dump operation by the processor 48 and a fast dump space (see later) of the NVS memory 52 is not needed. It will be appreciated to one skilled in the art that other secure means can be used to ensure that once the main power is down, data and instructions are safely stored in a fast but less-cost fashion.

The NV-Buffer 50 is coupled to the host adapter 44, the NSM 46, the NVS processor 48, and the NVS memory 52. The NV-Buffer 50 includes at least one track slot. The embodiment shown in FIG. 3, the NV-Buffer 50 includes a plurality of track slots 1, 2, . . . N. Each track slot includes a mailbox unit, a control block unit, and a write data unit. The mailbox unit receives a confirmation message that data of a write operation is committed from the host adapter 44. Any subsequent power shortage or update errors will not affect the committed data stored in the NV-Buffer, i.e. in the control block unit and the write data unit. A backup power source, such as a capacitor can be implemented to hold up the data in the NV-Buffer until the data are securely transferred and stored in the NVS memory 52. It will be appreciated that a person skilled in the art would recognize that other types of backup source can be used within the principles of the present invention. For example, a battery type of power source can be implemented to hold up the data in the NV-Buffer until the main power source is up. In one embodiment, the NV-Buffer 50 is a fast drain buffer which is able to safely or securely transfer and store the data in the fast dump space 58 of the NVS memory 52 within a short time, e.g. 500 milliseconds, i.e. the capacitor effective holding time. The fast dump operation is Using the fast drain NV-Buffer with a backup power source such as a capacitor, instead of using a battery-backed up buffer, significantly reduces the cost. Especially when a main power supply is down for a longer period of time, e.g. days, additional batteries would be required if using the battery-backed up buffer. Further, in one embodiment, to guard against undetected capacitor "shorts" causing the power to go down before fast drain operation is complete, an addition capacitor is used in a capacitor bank (not shown). If the confirmation message is not received in the mailbox unit of the NV-Buffer 50 when the main power is down, the data temporarily written in the write data unit will be discarded. The system will then later re-Write a complete data into the write data space 54 of the NVS memory 52. Therefore, no data is lost or partially-written due to the power down or other errors. The committed Write data operation, when the power is down, is transferred to the fast dump space 58 which is restored back to the NV-Buffer 50 when the power is up. Thus, the committed Write data operation continues such that the contents of the data and the characteristics of the data are written into the write data space 54 and the control block space 56 of the NVS memory 52, respectively. The control block unit of the NV-Buffer 50 stores the characteristics of the data. The write data unit of the NV-Buffer 50 stores the contents of the data. It will be appreciated that additional units can be added to a track slot of the NV-Buffer 50. It will also be appreciated that additional spaces can be added to the NVS memory 52.

The NVS memory 52 is a battery-backed, non-volatile memory, for example, DRAM, SRAM. It will be appreciated that other types of non-volatile storage devices can be used without departure from the scope and the spirit of the principals of the invention. The host adapter 44 can be a computer mainframe channel. The NV-Buffer 50 can be a RAM memory buffer. It will be appreciated that any other types of host adapters or system adapters and NV-Buffers can be used in accordance with the principles of the invention.

In one embodiment, the NV-Buffer 50 has 8 megabytes. Accordingly, the fast dump space 58 has 8 megabytes. It will be appreciated that other arrangements of the size of the NV-Buffer 50 and the fast dump space 58 can be made without departing from the principles of the invention.

Further in one embodiment as mentioned above, the transfer from the NV-Buffer 50 to the fast dump space 58 is about 500 milliseconds after a loss of power. It will be appreciated that other specifications regarding the transfer speed between the NV-Buffer 50 and the fast dump space 58 can be used without departure from the spirit and the scope of the invention.

The NVS memory initialization process is to make the NVS memory available during the initialization microcode load (IML) process. During this process, the volatile memory is checked; the control areas are staged from non-volatile into the volatile memory; the data is staged from non-volatile into the volatile memory; the stored data is scanned to see what requests had been written but not yet completed when power was lost; incomplete requests which have not been committed are disregarded and incomplete requests which have been committed are completed. It will be appreciated that other types of initialization of the NVS memory 52 can be arranged in accordance with the present invention.

In FIG. 3, the interconnections among the host CPU 42, HA 44, NSM 46, NVS processor 48, NV-Buffer 50, and NVS memory 52 are via system buses, e.g. PCI adapter buses. Other various input/output processors (IOPs) can attach to the system buses and support communication with a variety of storage and input/output (I/O) devices, such as direct access storage devices (DASD), tape drives, remote communication lines, workstations, and printers, etc. It should be understood that FIG. 3 is intended to depict representative components of a computer data storage system 40, and that the number and types of such components may vary. Those skilled in the art will recognize that the exemplary environment illustrated in FIG. 3 is not intended to limit the present invention. Indeed, those skilled in the art will recognize that other alternative hardware environments may be used without departing from the scope of the present invention.

Those skilled in the art will also recognize that the present invention may be implemented as a method, apparatus, or article of manufacture using standard programming and/or engineering techniques to produce software, firmware, hardware, or any combination thereof. The term "article of manufacture" as used herein is intended to encompass any device, carrier, or media that provides access to instructions and/or data useful in performing the same or similar functionality. Of course, those skilled in the art will recognize many modifications may be made to this configuration without departing from the scope of the present invention.

Write Data Operation

Figure 4:
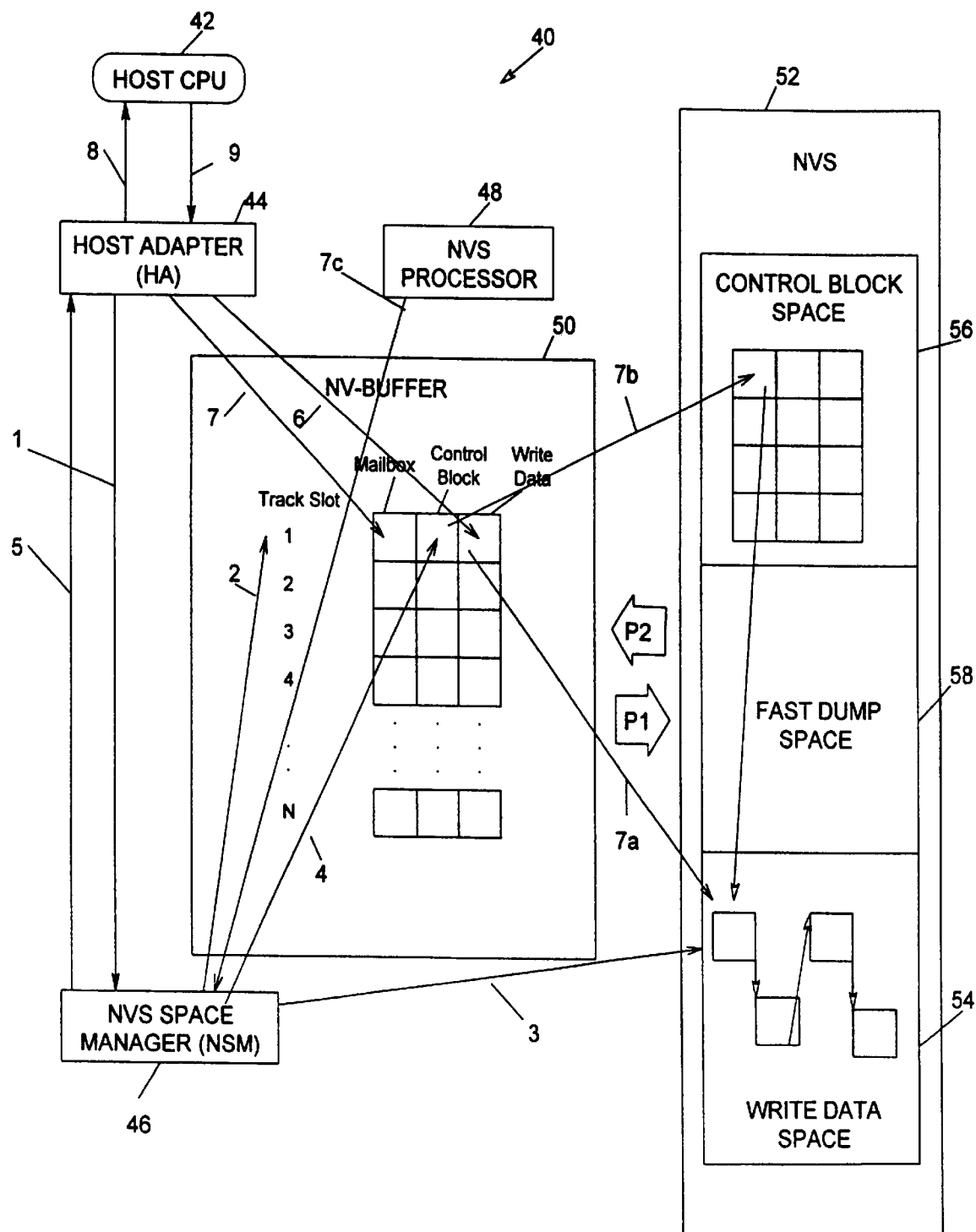
FIG. 4 is a process of writing data in the computer storage system of FIG. 3 consistent with the present invention.
Figure 5:
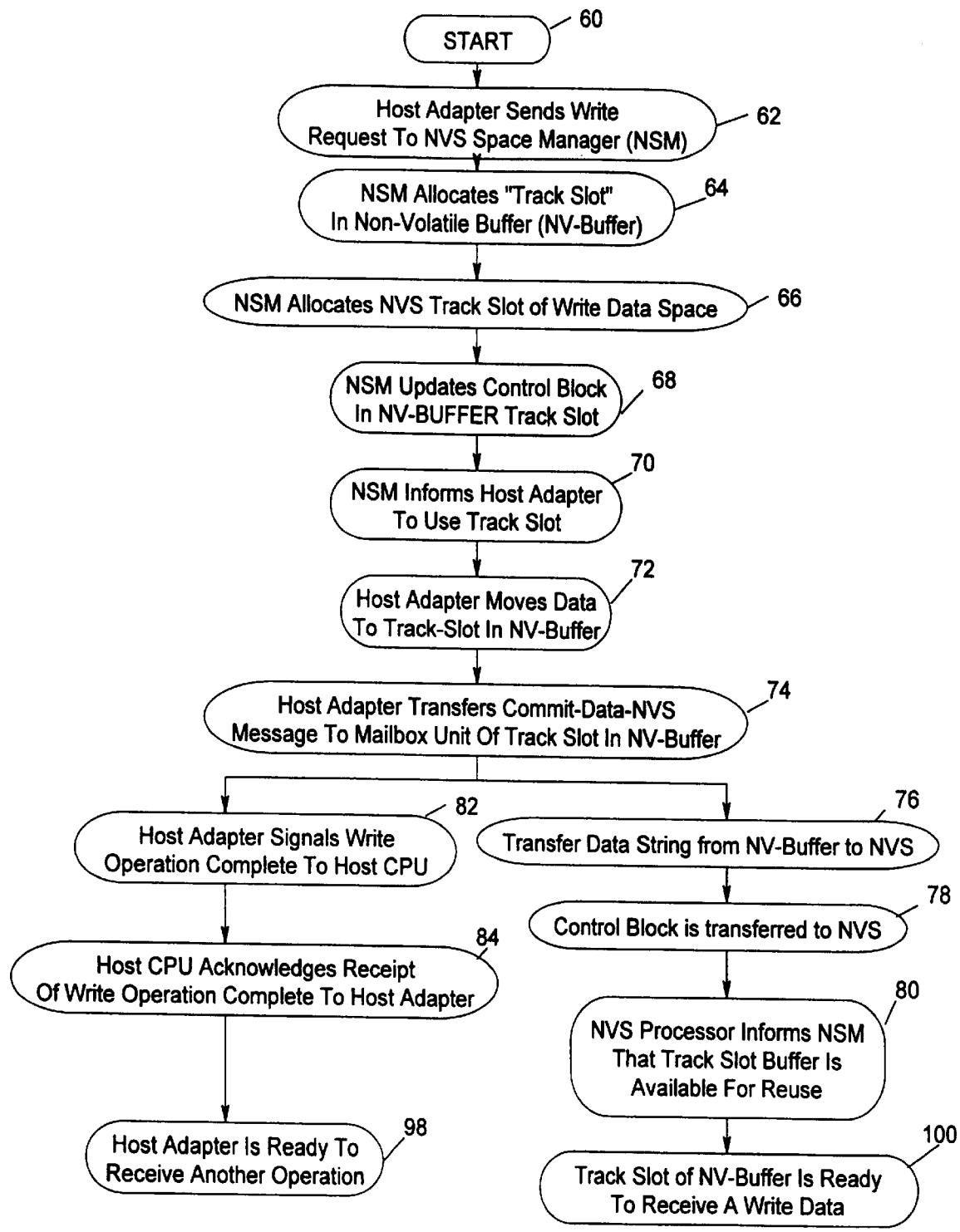
FIG. 5 is a flowchart of writing data in the computer storage system of FIG. 3 consistent with the present invention.

An exemplary Write data operation is shown in FIG. 4. FIG. 5 is a flowchart of the Write data operation. Steps from 1)–9) completes a Write data operation. Steps P1)–P2) operate to securely store the committed data in a write operation when power down occurs.

The steps of performing the exemplary Write data operation are shown in FIG. 5 which starts with Box 60. The steps are described as follows:

1) The host adapter 44 sends a Write request to the NSM 46, as shown in Box 62 of FIG. 5.
2) NSM 46 allocates a track slot of the Write data space 54 of the NVS memory 52, as shown in Box 64.
3) NSM 46 allocates the write data space 54 of the NVS memory 52, as shown in Box 66.

4) NSM 46 updates the control block unit of the NV-Buffer 50, as shown in Box 68.

5) NSM 46 sends a signal to the host adapter 44 to inform the host adapter 44 to use the track slot of the NV-Buffer 50, as shown in Box 70.

6) The host adapter 44 transfers the data to a track slot in the NV-Buffer 50, as shown in Box 72.

7) The host adapter 44 transfers a confirmation message to the mailbox unit of the track slot in the NV-Buffer 50, as shown in Box 74.

8) The host adapter 44 signals to the host CPU 42 that a Write operation is complete, as shown in Box 82.

9) The host CPU 42 acknowledges receipt of the Write operation complete to the host adapter 44, as shown in Box 84, whereby the host adapter is ready to receive another instruction, e.g. read or write, etc.

While steps 8)–9) are running on the foreground, the following steps 7a)–7c) are running on the background:

7a) The contents of the Write data unit of the NV-Buffer 50 is transferred to the Write data space 54 of the NVS memory 52, as shown in Box 76. The 5 string of data is stored in the slots of the Write data space 54.

7b) The contents of the control block unit of the NV-Buffer 50 is transferred to the control block space 56 of the NVS memory 52, as shown in Box 78. The contents are stored in one of the slots or units of the control block space 56.

7c) The NVS processor 48 informs the NSM 46 that the track slot in the NV-Buffer is available for reuse, i.e. for other Write data operations, as shown in Box 80.

As shown in FIG. 5, after step 9), the host adapter 44 is ready to receive another read, write, or other instruction. Meanwhile, after step 7c), the track slot in the NV-Buffer 50 is ready to receive another write data.

Figure 6:
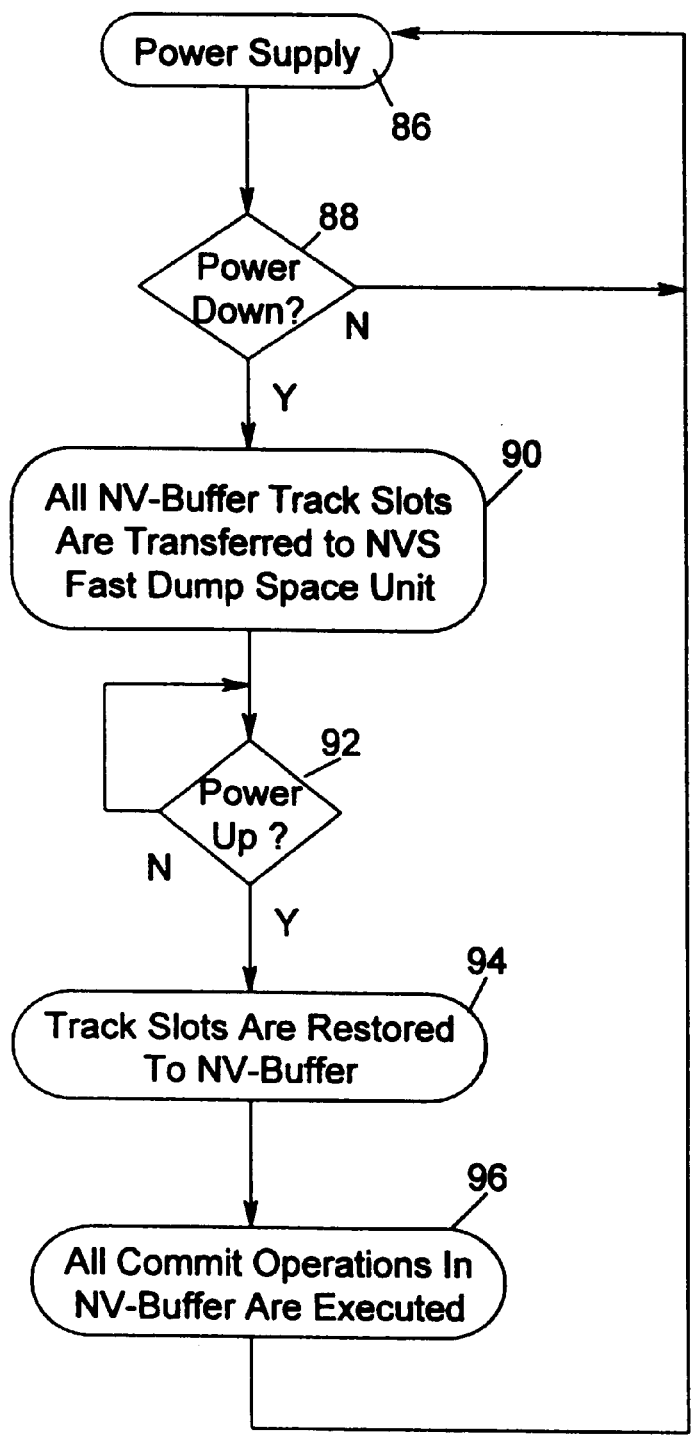
FIG. 6 is a flowchart of power supply operation in the computer storage system of FIG. 3 consistent with the present invention.

The steps for securely storing the committed data when power is down are shown in FIG. 6 and described as follows:

P1) If a main power supply in box 86 is down shown from box 88, all of the NV-Buffer track slots are dumped into the fast dump space 58 of the NVS memory 52, as shown in Box 90.

P2) When the main power supply is up from box 92, the NVS memory 52 initializes, and the track slots are restored to the NV-Buffer 50 in box 94, and all committed write operations are continued to be completed in Box 96.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A data storage system for securely storing data, comprising:

(a) a host CPU;
   (b) a non-volatile storage (NVS) memory for storing data;
   (c) a processor, the processor being coupled to the host CPU and the NVS memory and monitoring availability of space in the NVS memory and in a non-volatile buffer (NV-Buffer), the NV-Buffer being coupled to the host CPU, the NVS memory, and the processor; and
   (d) wherein upon receiving a request to write data into the NVS memory, the host CPU storing data to be transferred to the NVS memory into the NV-Buffer, and upon receiving a confirmation message that data of a write operation to the NV-Buffer is committed, the NV-Buffer transferring the data to the NVS memory.

2. The data storage system of claim 1, wherein the NV-Buffer includes at least one track slot, the track slot including a mailbox unit which receives the confirmation message, a control block unit which stores characteristics of the data requested to be stored, a write data unit which stores the contents of the data.

3. The data storage system of claim 2, wherein the NVS memory includes a control block space for receiving contents from the control block unit of the NV-Buffer and a write data space for storing contents of the write data unit of the NV-Buffer, such that upon receiving the confirmation message that data of a write operation to the NV-Buffer is committed, the NV-Buffer transferring the data to the NVS memory at which time the host CPU is notified that the write operation is complete.

4. The data storage system of claim 2, wherein the NVS memory further includes a fast dump space for storing the track slot of the NV-Buffer transferred when power is down and for restoring back the track slot to the NV-Buffer when the NVS memory initializes.

5. A method for securely storing data in a data storage system, comprising the steps of:

(a) receiving, by a host CPU, a request to write data into a non-volatile storage (NVS) memory of the data storage system;
   (b) monitoring, by a processor, availability of space in the NVS memory and in a non-volatile buffer (NV-Buffer), the NV-Buffer being coupled to the host CPU, the NVS memory, and the processor which is coupled to the host CPU;
   (c) transferring the data to the NV-Buffer if space is allocated;
   (d) transferring the data from the NV-Buffer to the NVS memory upon receiving a confirmation message that data of a write operation to the NV-Buffer is committed.

6. The method of claim 5, further comprising the step of:

(e) acknowledging to the processor that at least one track slot of the NV-Buffer is available for reuse after completing transferring the data from the NV-Buffer to the NVS memory.

7. The method of claim 5, further comprising the step of:

(e) transferring the data stored in the NV-Buffer to a fast dump space of the NVS memory.

8. The method of claim 7, further comprising the step of:

(f) restoring the transferred data back to the NV-Buffer from the fast dump space of the NVS memory.

9. The method of claim 5, wherein the step of transferring the data from the NV-Buffer to the NVS memory includes transferring data from a write data unit of the NV-Buffer to a write data space of the NVS memory and characteristics of the data from a control block unit of the NV-Buffer to a control block space of the NVS memory.

10. A computer storage system, comprising:

(a) a host central processing unit (Host CPU);
   (b) a host adapter (HA), the host adapter being coupled to the host central processing unit;
   (c) a non-volatile storage space manager (NSM), the non-volatile storage space manager being coupled to the host adapter;
   (d) a non-volatile buffer (NV-Buffer), the non-volatile buffer being coupled to the host adapter and the non-volatile storage space manager, the buffer including a plurality of track slots, each track slot having a mailbox unit which receives a confirmation message that data of a write operation is committed, a control block unit which stores characteristics of data requested to be stored, a write data unit which stores the contents of the data requested to be stored;

(e) a non-volatile storage processor (NVS Processor), the storage processor being coupled to the NV-Buffer and to the non-volatile space manager to indicate that one of the track slots is available to be reused; and (f) a non-volatile storage memory (NVS memory), the NVS memory being coupled to the non-volatile buffer and the non-volatile storage space manager, the NVS memory including a control block space for receiving contents from the control block unit of the NV-Buffer and a write data space for storing contents of the write data unit of the NV-Buffer.

11. The computer storage system of claim 10, wherein the NVS memory further includes a fast dump space for storing the track slots of the buffer when power is down and for restoring back the track slots to the non-volatile buffer when the NVS memory initializes.

12. A method of storing data in a computer storage system, comprising the steps of:

(a) sending a write data signal by a host adapter (HA) to a non-volatile space manager (NSM);

(b) allocating, by the non-volatile space manager, a plurality of track slots in a non-volatile buffer (NV-Buffer);

(c) allocating, by the non-volatile space manager, track slots of a write data space in a non-volatile storage (NVS) memory;

(d) updating, by the non-volatile space manager, a control block unit of one of the track slots in the NV-Buffer;

(e) sending, by the non-volatile space manager, a signal to the host adapter to use the track slot in the NV-Buffer;

(f) transferring data to a write data unit of the one of the track slot in the NV-Buffer;

(g) transferring a confirmation message, by the host adapter, to a mailbox unit of the NV-Buffer that data of a write operation is committed;

(h) signaling, by the host adapter, to a host central processing unit (Host CPU) that the write operation is complete;

(i) acknowledging, by the host central processing unit, to the host adapter receipt of the write operation complete signal sent by the host adapter such that the host adapter is available;

(j) transferring the data from the write data unit of the NV-Buffer to the write data space of the NVS memory;

(k) transferring contents from the control block unit of the NV-Buffer to a control block space of the NVS memory; and (l) sending a signal by a non-volatile storage processor (NVS Processor) to the non-volatile space manager to indicate the track slot of the buffer is available for reuse.

13. The method of claim 12, further comprising the steps of:

(m) transferring entire track slots of the NV-Buffer to a non-volatile storage fast dump space of the NVS memory.

14. The method of claim 13, further comprising the steps of:

(n) restoring at least a portion of the transferred track slots of the NV-Buffer from the fast dump space of the NVS memory to the track slots of the NV-Buffer.

15. An article of manufacture for a computer-based data storage system, the article of manufacture comprising a computer readable medium having instructions for causing a computer to perform a method comprising the steps of:

(a) receiving, by a host CPU, a request to write data into a non-volatile storage (NVS) memory of the data storage system;

(b) monitoring, by a processor, availability of space in the NVS memory and in a non-volatile buffer (NV-Buffer), the NV-Buffer being coupled to the host CPU, the NVS memory, and the processor which is coupled to the host CPU;

(c) transferring the data to the NV-Buffer if space is allocated;

(d) transferring the data from the NV-Buffer to the NVS memory upon receiving a confirmation message that data of a write operation to the NV-Buffer is committed.

16. A data storage system for securely storing data, the data storage system being supported by a main power source comprising:

(a) a host CPU;

(b) a non-volatile storage (NVS) memory for storing data including a fast dump space;

(c) a processor, the processor being coupled to the host CPU and the NVS memory and monitoring availability of space in the NVS memory and in a NV-Buffer, the NV-Buffer being coupled to the host CPU, the NVS memory, and the processor; and (d) a backup power source for supporting the processor and the NV-Buffer, wherein when the main power source is down, the backup power source having a sufficient power for the data stored in the NV-Buffer to be transferred and stored in the fast dump space of the NVS memory.

17. The data storage system of claim 16, wherein when the main power source is up, the data stored in the fast dump space of the NVS memory is transferred and restored back to the NV-Buffer.

18. The data storage system of claim 17, wherein when the main power source is up, the backup power source is recharged.

19. The data storage system of claim 16, wherein the backup power source is at least one capacitor.

20. A data storage system for securely storing data, the data storage system being supported by a main power source comprising:

(a) a host CPU;

(b) a non-volatile storage (NVS) memory for storing data including a fast dump space;

(c) a processor, the processor being coupled to the host CPU and the NVS memory and monitoring availability of space in the NVS memory and in a NV-Buffer, the NV-Buffer being coupled to the host CPU, the NVS memory, and the processor; and (d) a backup power source for supporting the processor, wherein when the main power source is down, the backup power source having a sufficient power for data and instructions stored in cache memories of the processor to be transferred and stored the NV-Buffer.

21. The data storage system of claim 20, wherein the backup power source is at least one capacitor.

* * * * *

UNITED STATES PATENT AND TRADEMARK OFFICE
CERTIFICATE OF CORRECTION

PATENT NO. : 6,035,347
DATED : March 7, 2000
INVENTOR(S) : Beardsley et al.

It is certified that error appears in the above-identified patent and that said Letters Patent is hereby corrected as shown below:

Column 2,
Line 35, replace "is received" with -- as received --;

Column 3,
Line 6, add a hyphen after 'con';

Column 6,
Line 2, replace "a" with -- an --;

Column 6,
Line 35, replace "a" with -- an --;

Column 7,
Line 26, replace "Using" with -- using --;

Column 9,
Line 22, delete "5" before "string";

Column 12,
Line 34, delete "a";

Column 10,
Lines 41 and 46, delete "(e)";
Line 49, delete "(f)".

Signed and Sealed this

Second Day of July, 2002

*Attest:*

*Attesting Officer*

JAMES E. ROGAN
*Director of the United States Patent and Trademark Office*